United States Patent
Basso et al.

(10) Patent No.: US 7,106,698 B1
(45) Date of Patent: Sep. 12, 2006

(54) SYSTEM FOR TRIGGERING THE CONTROL PLANE IN AN ASYNCHRONOUS CONNECTION-ORIENTED TRANSMISSION NETWORK

(75) Inventors: Claude Basso, Nice (FR); Philippe Damon, Cagnes-sur-mer (FR); Guy Menanteau, Cagnes-sur-mer (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/334,415

(22) Filed: Jun. 16, 1999

(30) Foreign Application Priority Data

Sep. 16, 1998 (EP) .................................. 98480063

(51) Int. Cl.
*H04L 12/26* (2006.01)
*H04L 12/66* (2006.01)
*H03L 12/28* (2006.01)
*H04Q 7/24* (2006.01)

(52) U.S. Cl. ...................... 370/232; 370/248; 370/252; 370/356; 370/395.21

(58) Field of Classification Search ............. 370/395.1, 370/395.2, 395.21, 395.6, 400, 410
See application file for complete search history.

(56) References Cited

U.S. PATENT DOCUMENTS

| | | | | |
|---|---|---|---|---|
| 5,029,164 A | * | 7/1991 | Goldstein et al. ............ | 370/235 |
| 5,519,699 A | * | 5/1996 | Ohsawa ........................ | 370/231 |
| 5,574,724 A | * | 11/1996 | Bales et al. ................... | 370/410 |
| 5,579,480 A | | 11/1996 | Cidon et al. ............... | 395/200.1 |
| 5,673,263 A | | 9/1997 | Basso et al. .................. | 370/396 |
| 5,673,264 A | * | 9/1997 | Hamaguchi ................... | 370/397 |
| 5,757,783 A | * | 5/1998 | Eng et al. ..................... | 370/315 |
| 5,812,528 A | * | 9/1998 | VanDervort .................. | 370/235 |
| 6,058,114 A | | 5/2000 | Sethuram et al. ............ | 370/397 |
| 6,128,305 A | * | 10/2000 | Hjalmtysson et al. ........ | 370/410 |
| 6,147,998 A | * | 11/2000 | Kelley et al. ............. | 370/395.1 |

* cited by examiner

*Primary Examiner*—Chi Pham
*Assistant Examiner*—Melanie Jagannathan
(74) *Attorney, Agent, or Firm*—Cesari and McKenna LLP

(57) ABSTRACT

Asynchronous connection-oriented transmission network of the (ATM) network type comprising a plurality of switching nodes (12, 14, 16, 18) interconnected by connection lines, each of these switching nodes being associated with a control point in charge of determining the best route between any source node (12) and any destination node (18) when a connection has to be established therebetween by identifying which ones of the connection lines are eligible based upon the requirement of a quality of service. Such an ATM network is characterized in that each switching node comprises Control ATM Test Application (CATMTA)(22) and a Deamon ATM Test Application (DATMTA)(32) so that, at any time, a user interfacing a source node can test the connectivity of a network connection from the source node to a destination node by initiating a connection procedure wherein a call setup message is sent by the CATMTA of the source node to the destination node and the DATMTA of the destination node sends back an acknowledgment message to the source node.

20 Claims, 3 Drawing Sheets

SYSTEM FOR TRIGGERING THE CONTROL PLANE IN AN ASYNCHRONOUS CONNECTION-ORIENTED TRANSMISSION NETWORK

TECHNICAL FIELD

The present invention relates to systems enabling testing for the availability of connections in an asynchronous connection-oriented transmission network such as an Asynchronous Transfer Mode (ATM) network or a Frame Relay network and particularly to a method for triggering the control plane in such a network.

BACKGROUND

Different techniques have been developed for transporting information over a network, such as packet switching techniques whereby digitized data is arranged into so-called bit packets, and circuit switching techniques. In packet switching, the bit packets may either be of fixed length like in the Asynchronous Transfer Mode (ATM) where the packets, also called cells, are all of a conventional fixed length, or be of variable length.

ATM has been recognized as the common base on which different types of services and networks can operate. The ATM technology can efficiently combine the transmission of speech, video, audio (what is commonly called the multimedia traffic) and computer data into the wired network. Furthermore, ATM has proven to scale well from very high speed network infrastructure (the information highways) to customer premises networks. One of the great advantages of the ATM technology is the fact that it can guarantee some level of service when an ATM connection is set up. Such guarantees can correspond to transmission rate, transmission latency and information loss. They can be achieved mainly because the ATM architecture assumes that the transmission media are almost error free.

At the beginning of the ATM technology, there were only Permanent Virtual Connections (PVC). Switched Virtual Connection (SVC) were soon developed. SVCs supported the growth of ATM by providing bandwidth on demand, in real time, to any user destination, with custom-tailored performance to meet the needs of almost any application. From the beginning, SVCs have been integrated to ATM specifications and most ATM customer equipment supports SVCs.

To establish a SVC connection, a routing procedure takes place during which the control point of the source node determines the best route to the destination node. Afterwards, the source control point sends a call setup message, a copy of which is delivered to the control point of every switching node on the route. The call setup message includes all the critical information needed to define and support a connection, and is based upon information contained in the request initiated by an end user or an application. When routing the connection, the network ensures that the selected path has sufficient resources to support the traffic descriptor, bearer capability and Quality of Service (QoS) parameters specified in the call setup message. This is done by the Connection Admission Control (CAC). Then, when the call setup message is received at the destination node, a confirmation message is sent back to the source node which can initiate the exchange of information between the source node and the destination node.

All these procedures for establishing a connection are controlled by the control plane managed by a control point in each node of the network.

ATM networks are getting more and more complex and are being used to handle critical data. Therefore, the control plane is more and more complex and becomes a critical element of such networks. Unfortunately, there is currently no tool to test and verify that the control plane of a network (formed of the control planes of network nodes used in the connection) works properly in a real environment (e.g. a production network).

A solution known as Internet Protocol (IP) "Ping", was been originally designed to check the availability of a path in the IP world and whether a destination device could be reached by sending out an echo ICMP (Internet Control Message Protocol) to the specified destination device and just waiting for an acknowledgment sent back by the destination device. This procedure is mainly used for networks of routers. Even if a "Ping" works, this cannot ensure that a data stream will actually flow because of the connectionless nature of IP. There is no control plane insofar as the path is determined at the time when the data is sent in the network. Furthermore, there are no Quality of Service parameters.

One advantage of the ATM is its ability to integrate the IP protocol. For that, the first step is to define Higher Layer Protocols (HLP) to emulate the LAN protocols above ATM. Thus, LAN emulation and classical IP are widely used. The advantage is that the applications developed on top of an IP stack are still working transparently. Of course, the "Ping" function is still implemented when IP is used on top of these HLPs since, due to the connection-oriented nature of ATM, the connection must be established prior to the data transmission.

The problem with the HLPs is that they require an extra process to actually establish a connection between two users. In fact, an additional server is necessary to translate the addresses of HLPs (e.g. IP addresses) into ATM and vice-versa. That is why each user must first register to the server before doing anything else and in particular trying to do a "Ping". This is not very satisfying for testing the connectivity because the "Ping" procedure may not work for reasons which are unrelated to the control plane such as when the server has failed. Therefore, the HLPs do not integrate the full QoS capabilities of ATM.

Another solution for checking if an ATM connection is working properly is to use Operation Administration Management (OAM) cells. OAM cells were designed to test an ATM network through the user plane. Unfortunately, OAM cells do not trigger the control plane and in particular the Connection Admission Control (CAC). Besides, a connection must be established prior to the use of OAM cells. In fact, OAM cells simply check the physical path but do not test the establishment of a connection characterized by specific traffic parameters.

SUMMARY OF THE INVENTION

Accordingly, the main object of the invention is to provide a method enabling to test at any time, the connectivity from a source node to a destination node in an asynchronous connection-oriented network such as ATM network.

Another object of the invention is to provide a method for testing the availability of a network connection characterized by its traffic parameters.

Another object of the invention is to provide a method for triggering the control plane in an asynchronous connection-oriented network in order to test any connection between two nodes by using traffic parameters requested by the user.

The invention relates to an asynchronous connection-oriented transmission network comprising a plurality of switching nodes interconnected by connection lines, each switching node being associated with a control point which is in charge of when a connection has to be established therebetween by identifying which of the connection lines are eligible based upon the requirement of a quality of service. Each switching node comprises a Control ATM Test Application (CATMTA) and a Deamon ATM Test Application (DATMTA) so that, at any time, a user interfacing a source node can test the connectivity of a network connection from the source node to a destination node by initiating a connection procedure wherein a call setup message is sent by the CATMTA of the source node to the destination node and the DATMTA of the destination node sends back an acknowledgment message to the source node.

BRIEF DESCRIPTION OF THE DRAWINGS

The objects, characteristics and advantages of the invention will become clear from the following description given in reference to the accompanying drawings wherein.

Detailed description of the invention

Figure 1:
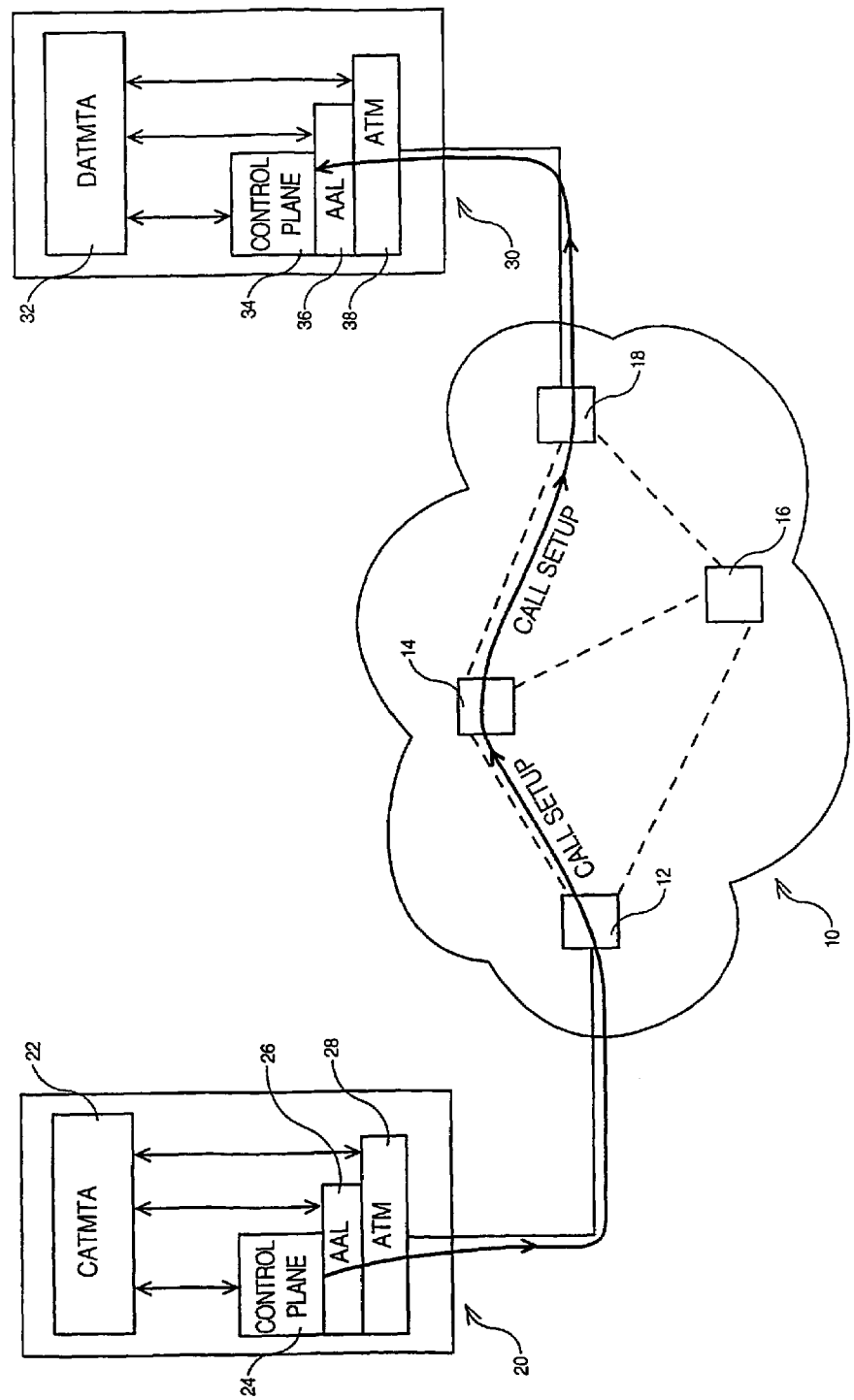
FIG. 1 represents a block-diagram of an ATM network wherein a Control ATM Test Application (CATMTA) of a source node initiates a connection by sending a call setup message to a Deamon ATM Test application (DATMTA) of a destination node.
Figure 2:
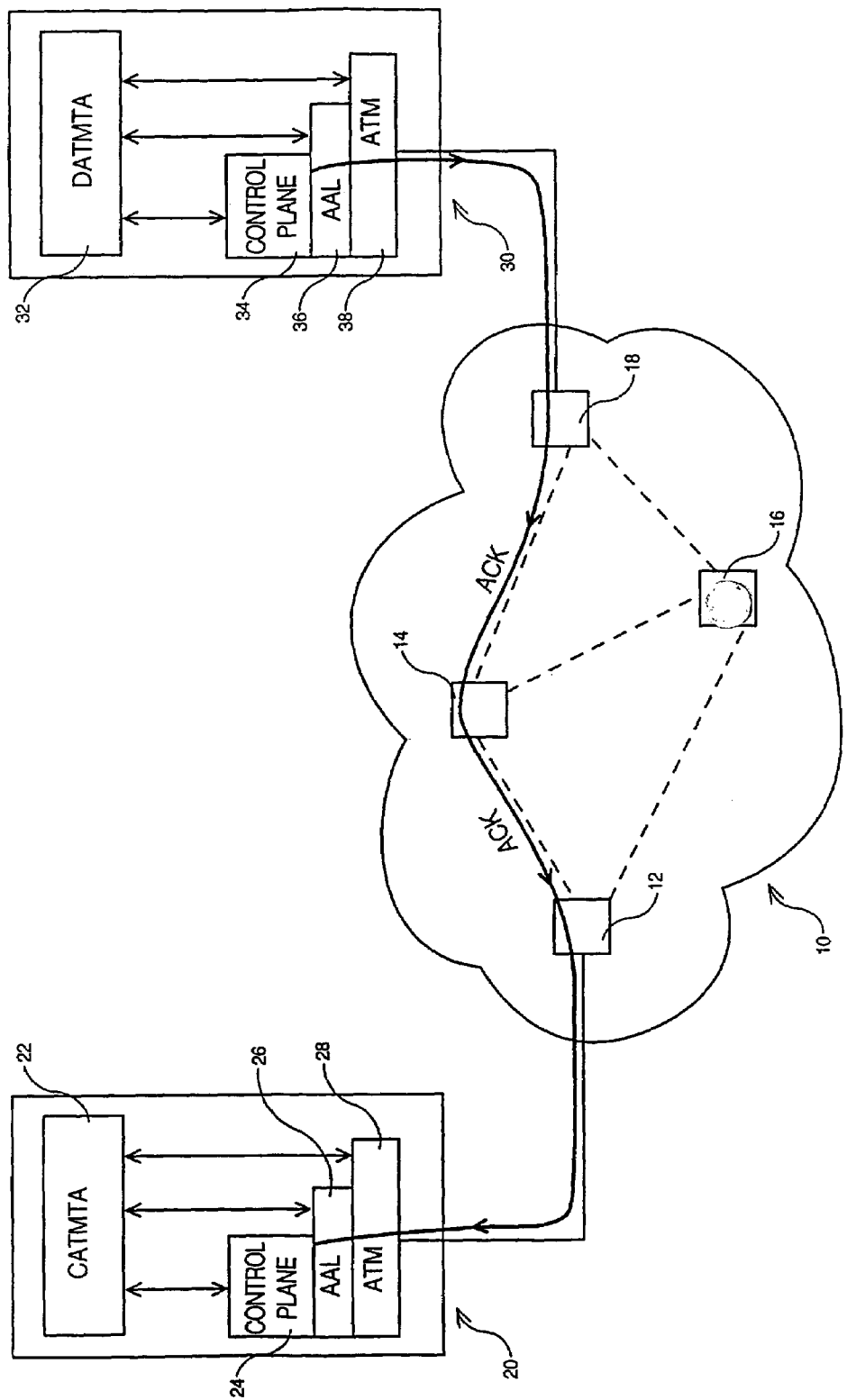
FIG. 2 represents the same block-diagram of an ATM network wherein the DATMTA of the destination node sends back an acknowledge message to the CATMTA of the source node.
Figure 3:
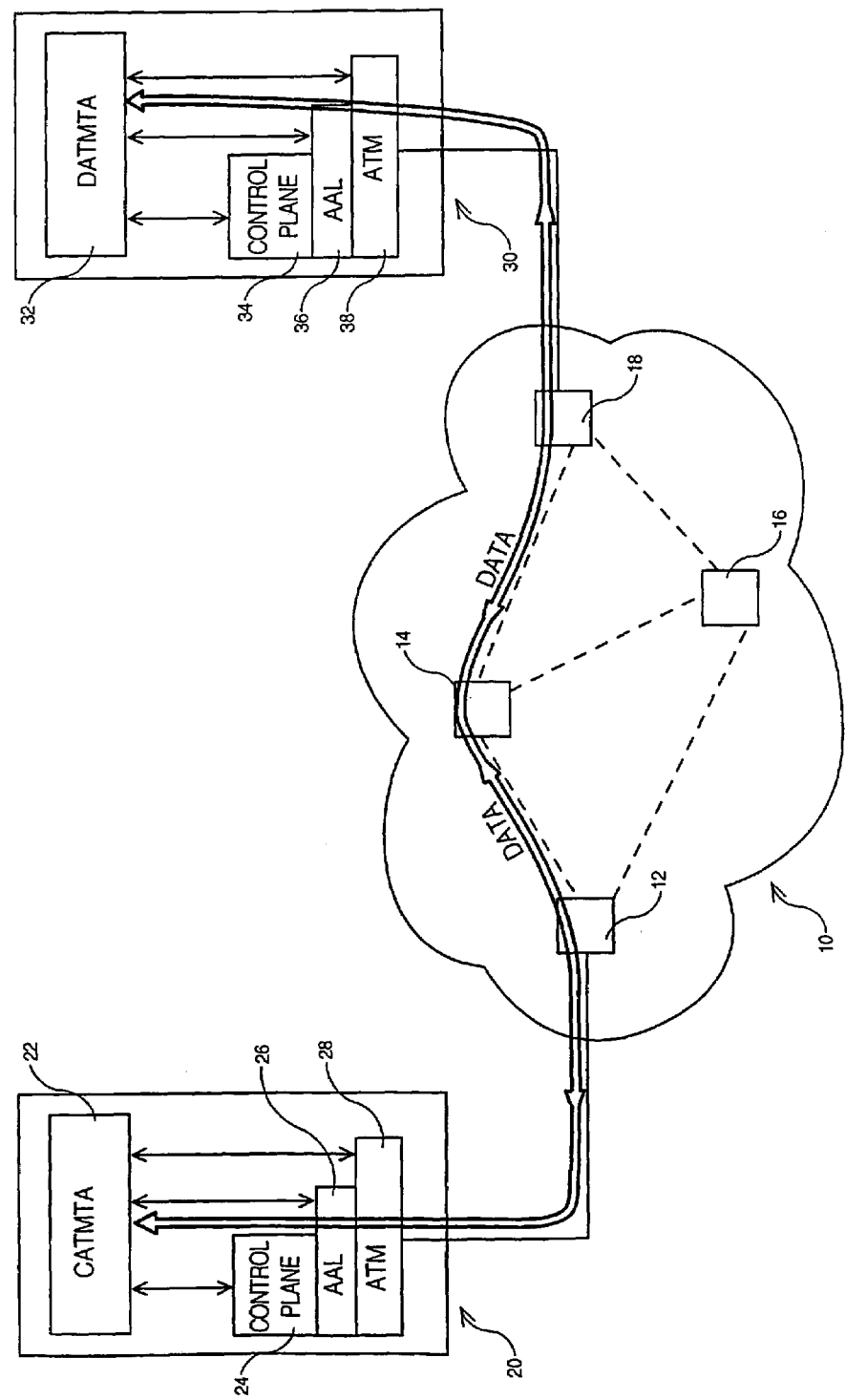
FIG. 3 represents the same block-diagram of an ATM network showing the data stream exchanges between the CATMTA of the source node and the DATMTA of the destination node for verifying the characteristics of the connection.

As shown schematically in FIGS. 1, 2 and 3, an ATM network 10 includes a plurality of switching nodes 12, 14, 16 and 18. In the present illustration, switching node 12 will be the source node and switching node 18 will be the destination node.

Each node of the network includes a control point which are illustrated only for source node 12 and destination node 18. The control point 20 of source node 12 comprises a Control ATM Test Application (CATMTA) 22, a control plane 24, an adaptation ATM layer (AAL) 26 and an ATM layer 28. CATMTA 22 is connected to control plane 24 but is also connected to AAL 26 and to ATM layer 28.

In the same way, the control point 30 of destination node 18 comprises a Deamon ATM Test Application (DATMTA) 32, a control plane 34, an adaptation ATM layer (AAL) 36 and an ATM layer 38. DATMTA 32 is connected to control plane 34 but is also connected to AAL 36 and ATM layer 38.

Although only a CATMTA has been represented for source node 12 and only a DATMTA has been represented for destination node 18, each of these two nodes, and in a general way, each node of the network includes both CATMTA and DATMTA. Indeed, each node could be used as a source node or a destination node in the procedure implementing the invention. Note that both CATMTA and DATMTA of the same node can be used at the same time.

It must also be noted, that the control point associated with the source node or with the destination node could be outside the node, such as an independent station or any Data Terminal Equipment (DTE).

The procedure described hereafter in reference to the Figures illustrates how are used the CATMTA and DATMTA are used according to the invention.

First, CATMTA 22 associated with source node 22 receives a request from an end user or from a higher level application (not shown) to establish a connection with several parameters. There are three sets of parameters: general parameters such as the number of connection establishment retries in the case of failures or the lifetime of the connection; call setup parameters which will determine the characteristics of the connection. Among them, the most important are the destination ATM address (which is the address of the destination node), the bandwidth parameters, the Quality of Service (QoS) parameters, the type of the connection; i.e., point to point or point to multipoint, virtual circuit or virtual path; and the data stream parameters such as the data stream format, its size, its frequency and any kind of measures to perform.

CATMTA 22 requests the establishment of the connection with destination node 18 by triggering (signaling and routing) control plane 24. A call setup message is sent from source node 12 to destination node 18 through the switching nodes of the network 10 such as switching node 14 as illustrated in FIG. 1. As usual the control plane of each switching node of the connection is triggered by the call setup message. Note that, if the network fails to deliver the call setup message to the destination node, CATMTA 22 of source node 12 is aware of this failure and it notifies to the requesting end user or application.

When the call setup message is successfully delivered to destination node 18, it is actually received by DATMTA 32. DATMTA accepts the incoming message and sends back an acknowledge message (connect message) toward source node 12 as illustrated in FIG. 2. The acknowledge message being received by CATMTA 22, the connection is effectively established between source node 12 and destination node 18. The work of the control plane is completed. CATMTA notifies the requesting end user or application that the connection has been successfully established.

According to another aspect of the invention, the new means which are CATMTA and DATMTA can be used for verifying the characteristics of the connection which has just been established between source node 12 and destination node 18 by exchanging data streams as illustrated in FIG. 3. It must be noted that such a verification would not be possible if a classical connection in the ATM network was normally established without using CATMTA and DATMTA.

CATMTA 22 of source node 12 sends a data stream over the connection. If the connection is actually established, the data stream is received by DATMTA 32 of destination node 18. DATMTA 32 will decode this data stream and it will respond back with another data stream. CATMTA 22 receives the response. Everything works so far. CATMTA 22 notifies the end user or the application. In addition, CATMTA 22 may perform several retries, statistics, etc. . .

If the connection is not actually established, either the data stream sent by CATMTA 22 will not be received by DATMTA 32, or the response sent back by DATMTA 32 will not be received by CATMTA 22. In both cases, CATMTA 22 will never get any response, and it notifies the end user or the application of this failure.

This data stream can be used to check the actual connection's characteristics which has been established by the control plane. As there are a lot of possible combinations of these characteristics, it is impossible to make an exhaustive list of all tests.

For each individual test, a specific initial data stream is sent by the CATMTA. The DATMTA recognizes the nature data stream and can act differently.

Here is a simple example to check the end to end transit delay of the connection. The end to end transit delay is the maximum acceptable time for an ATM cell to flow from the source node the destination node. This value is specified in the call setup message at the creation time of the connection. If the control plane works properly, the actual value of the end to end transit delay must be lower than the one given in the call setup message.

With the following data stream format, it is possible to measure the actual end to end transit delay of the connection:

The data stream sent by the CATMTA includes the time T1 at which the data stream is sent. The data stream is received by the DATMTA at time T2. The DATMTA sends back the answer at time T3. The overhead of the DATMTA is T3−T2. This value is put in the response data stream. The response data stream is received by the CATMTA at time T4. So, the end to end transit delay is given by the formula: T=(T4−(T3−T2)−T1)/2. This value can be compared with the one requested by the user or the application.

To check whether the bandwidth BW requested by the user or the above application has been actually allocated for a constant bit rate connection, a specific data stream has to be sent at the rate BW by the CATAMTA during an amount of time T. The DATMTA which receives the data steam recognizes the header and starts to count the received data (the bytes for example) and the time during which the data are received. When it doesn't receive any more data, it sends back a response data stream in which it puts the amount of received data and the measured time. The CATMTA can then compare the values and it may detect that some data have been lost (cell discarded in the network) for example.

While the above description has been made by considering an ATM network, it is clear that the invention could be implemented in any other asynchronous transmission network of the ATM network type such as a Frame Relay network wherein the packets has a variable length.

The invention claimed is:

1. Method for triggering the control plane in an asynchronous connection-oriented transmission network, comprising the following steps initiated at any time on request by a source node:
   sending from the Control ATM Test Application (CATMTA) of said source node a call setup message for testing the connectivity of a network connection to the Deamon ATM Test Application (DATMTA) of a destination node, and
   sending back an acknowledgement message from said DATMTA of said destination node to said CATMTA of said source node when the connection has been successfully established between said source node and said destination node; and
   sending a verification data stream from said CATMTA in said source node to said destination node after receiving said acknowledgement message, and sending back a response data stream from said DATMTA in said destination node to said source node, said response data stream including a count by the destination node of an amount of data in the verification data stream received at the destination node, said response data stream further including a measured time span over which the destination node received the verification data stream, whereby said verification and response data streams are used to check the characteristics of the connection previously established between said source node and said destination node, including determining, by the source node, a bandwidth of the connection using the amount of data and the time span from the response data stream.

2. Method according to claim 1, wherein said verification and response data streams are used to check the end-to-end transit delay of the connection previously established between said source node and said destination node.

3. Method according to claim 1, wherein said verification and response data streams are used to check whether a desired bandwidth requested by said source node has been actually allocated for a constant bit rate over the connection previously established between said source node and said destination node.

4. A method for operating a computer, comprising:
   sending a call setup message over a computer network to a destination computer;
   receiving an acknowledgement message from the destination computer indicating that the call setup message was received, the acknowledgement message indicating that a connection through the computer network is established between the computer and the destination computer;
   sending a verification data stream to the destination computer in response to receiving the acknowledgement message, the verification data stream sent over the connection;
   receiving a response data stream from the destination computer, the response data stream sent over the connection, the response data stream including a count by the destination computer of an amount of data in the verification data stream received at the destination computer, the response data stream further including a measured time span over which the destination computer received the verification data stream; and
   checking a one or more characteristics of the connection in response to the verification data stream and the received response data stream, the checking including determining a bandwidth of the connection using the amount of data and the time span from the response data stream.

5. The method as in claim 4, further comprising:
establishing the connection in an Asynchronous Transfer Mode (ATM) computer network.

6. The method as in claim 4, further comprising:
establishing the connection in a Frame Relay computer network.

7. The method as in claim 4, further comprising:
checking an end-to-end transit delay of the connection using said verification and response data streams.

8. The method as in claim 4, further comprising:
checking whether a desired bandwidth requested by a user interfacing with said computer has been actually allocated for a constant bit rate over the connection by comparing the desired bandwidth and the bandwidth determined from the amount of data and the time span.

9. A computer, comprising:
means for sending a call setup message over a computer network to a destination computer;
means for receiving an acknowledgement message from the destination computer indicating that the call setup message was received, the acknowledgement message indicating that a connection through the computer network is established between the computer and the destination computer;
means for sending, at any time, a verification data stream to the destination computer in response to receiving the acknowledgement message, the verification data stream sent over the connection;
means for receiving a response data stream from the destination computer, the response data stream sent over the connection, the response data stream including a count by the destination computer of an amount of data in the verification data stream received at the destination computer, the response data stream further including a measured time span over which the destination computer received the verification data stream; and means for checking one or more characteristics of the connection in response to the verification data stream and the received response data stream, the means for checking including means for determining a bandwidth of the connection using the amount of data and the time span from the response stream.

10. The computer as in claim 9, further comprising:
means for establishing the connection in an Asynchronous Transfer Mode (ATM) computer network.

11. The computer as in claim 9, further comprising:
means for establishing the connection in a Frame Relay computer network.

12. The computer as in claim 9, further comprising:
means for checking an end-to-end transit delay of the connection using said verification and response data streams.

13. The computer as in claim 9, further comprising:
means for checking whether a desired bandwidth requested by a user interfacing with said computer has been actually allocated for a constant bit rate over the connection by comparison of the desired bandwidth and the bandwidth determined from the amount of data and the time span.

14. A computer, comprising:
a transmitter to send a call setup message over a computer network to a destination computer;
a receiver to receive an acknowledgement message from the destination computer indicating that the call setup message was received, the acknowledgement message indicating that a connection through the computer network is established between the computer and the destination computer;
a transmitter to send a verification data stream to the destination computer in response to receiving the acknowledgement message, the verification data stream sent over the connection;
a receiver to receive a response data stream from the destination computer, the response data stream sent over the connection, the response data stream including a count by the destination computer of an amount of data in the verification data stream received at the destination computer, the response data stream further including a measured time span over which the destination computer received the verification data stream; and
a processor to check one or more characteristics of the connection in response to the verification data stream and the received response data stream, the processor further adapted to determine a bandwidth of the connection using the amount of data and the time span from the response data stream.

15. The computer as in claim 14, further comprising:
the computer network is an Asynchronous Transfer Mode (ATM) computer network.

16. The computer as in claim 14, further comprising:
the computer network is a Frame Relay computer network.

17. The computer as in claim 14, further comprising:
means for checking an end-to-end transit delay of the connection using said verification and response data streams.

18. The computer as in claim 14, further comprising:
means for checking whether a bandwidth requested by a user interfacing with said computer has been actually allocated for a constant bit rate over the connection by comparison of the desired bandwidth and the bandwidth determined from the amount of data and the time span.

19. A computer readable media containing executable program, the executable program instructions comprising program instructions adapted for:
sending a call setup message over a computer network to a destination computer;
receiving an acknowledgement message from the destination computer indicating that the call setup message was received, the acknowledgement message indicating that a connection through the computer network is established between a computer and the destination computer;
sending, at any time, a verification data stream to the destination computer in response to receiving the acknowledgement message, the verification data stream sent over the connection;
receiving a response data stream from the destination computer, the response data stream sent over the connection, the response data stream including a count by the destination computer of an amount of data in the verification data stream received at the destination computer, the response data stream further including a measured time span over which the destination computer received the verification data stream; and
checking one or more characteristics of the connection in response to the verification data stream and the received response data stream, the checking including determining a bandwidth of the connection using the amount of data and the time span from the response data stream.

20. A method for operating a computer, comprising:
sending a call setup message over a computer network to a destination computer, the call setup message to initiate a roundtrip connection through the computer network;
receiving an acknowledgement message from the destination computer indicating that the call setup message was received, the acknowledgement message indicating that the roundtrip connection through the computer network is established between the computer and the destination computer;
sending, at any time, a verification data stream to the destination computer in response to receiving the acknowledgement message, the verification data stream sent over the connection;
counting data in the verification data stream and measuring the time during which the data are received, where counted data and measured time are part of a response data stream;
receiving the response data stream from the destination computer, the response data stream sent over the connection; and
checking the counted data and the measured time to determine a bandwidth of the connection.

* * * * *